(12) United States Patent
Medasani et al.

(10) Patent No.: US 9,076,206 B2
(45) Date of Patent: Jul. 7, 2015

(54) METHODS AND SYSTEMS FOR CORRECTING DISTORTIONS IN MULTIMEDIA CONTENT

(71) Applicant: Uurmi Systems Private Limited, Jubliee Hills, Hyderbad (IN)

(72) Inventors: Shanti S. Medasani, Hyderbad (IN); Ajinkya S. Deshmukh, Hyderbad (IN)

(73) Assignee: Uurmi Systems Private Limited (IN)

( * ) Notice: Subject to any disclaimer, the term of this patent is extended or adjusted under 35 U.S.C. 154(b) by 178 days.

(21) Appl. No.: 13/794,963

(22) Filed: Mar. 12, 2013

(65) Prior Publication Data
US 2014/0267918 A1 Sep. 18, 2014

(51) Int. Cl.
*G06K 9/40* (2006.01)
*G06T 5/00* (2006.01)

(52) U.S. Cl.
CPC ....... *G06T 5/003* (2013.01); *G06T 2207/10016* (2013.01); *G06T 2207/20021* (2013.01); *G06T 2207/20144* (2013.01); *G06T 2207/20182* (2013.01); *G06T 2207/20216* (2013.01)

(58) Field of Classification Search
None
See application file for complete search history.

(56) References Cited

U.S. PATENT DOCUMENTS

| 5,809,172 A | * | 9/1998 | Melen | 382/232 |
| 2005/0053158 A1 | * | 3/2005 | Regunathan et al. | 375/240.25 |
| 2009/0112958 A1 | * | 4/2009 | Cham et al. | 708/400 |
| 2010/0153692 A1 | * | 6/2010 | Kota et al. | 712/222 |
| 2012/0183175 A1 | * | 7/2012 | Alouini et al. | 382/103 |
| 2013/0191425 A1 | * | 7/2013 | Porikli et al. | 708/207 |

* cited by examiner

*Primary Examiner* — Chan Park
*Assistant Examiner* — Eueng-Nan Yeh
(74) *Attorney, Agent, or Firm* — Benjamin A. Balser; Balser & Grell IP Law

(57) ABSTRACT

Various embodiments of a method, system and computer program product for correcting distortions in a multimedia content comprising a set of temporal images are disclosed. Each image of the set of temporal images is decomposed into patches. Thereafter, each set of temporal patches is parsed hierarchically to obtain a set of background components and one or more moving objects. Thereafter, the set of background components and the one or more moving objects are aggregated to reconstruct the multimedia content.

21 Claims, 7 Drawing Sheets

METHODS AND SYSTEMS FOR CORRECTING DISTORTIONS IN MULTIMEDIA CONTENT

TECHNICAL FIELD

The presently disclosed embodiments generally relate to processing of multimedia content. More particularly, the presently disclosed embodiments relate to a technique of mitigating distortions in the multimedia content.

BACKGROUND

Various distortions, like atmospheric turbulence, degrade multimedia content such as images and videos by causing non-uniform geometric deformations and distortions due to random fluctuations of refractive index over air media. Atmospheric turbulence is a random phenomenon that distorts an imaging scene non-uniformly. The major distortions include geometric deformation and space-time varying blur. Mitigation of all such distortions and deformations in videos is a critical challenge.

Various techniques, such as, multi-frame image reconstruction and image averaging, have been implemented to mitigate such distortions. However, these techniques suit mostly for images and have limited scope when dealing with videos. Most of the video reconstruction procedures rely heavily on image registration techniques which are often computationally expensive.

Further, a technique based on iterative image registration has also been implemented to stabilize a sequence of frames and robust Principle Component Analysis (PCA) to eliminate sparse noise that remains after iterative registration. In any distorted or corrupted image or frame, low dimensional structure is hidden. The PCA is typically used to exploit lower dimensional embeddings from higher dimensional data. The PCA based approach has been successfully validated for data de-correlation and data dimensionality reduction in image and video processing applications. The major disadvantages with PCA based method are its sensitivity to outliers and gross data corruption. The iterative image registration and robust PCA based method removes water wave turbulence present in underwater scenes and can also be applied to air turbulence since both water and air turbulence are having nearly same effects with more blurring than warping in later case. This method has certain disadvantages like high computational cost due to iterative image registration procedure and no moving object detection capability. In addition, this method is sensitive to blur estimation stage in the sense that unnecessary blur may be introduced in reconstructed result if blur is wrongly estimated.

Thereafter, an approach to mitigate the turbulence and simultaneous detection of moving object was introduced. The approach included separating the input image into its constituent turbulence, foreground, and background images using matrix decomposition. A separate norm to minimize each component (e.g., turbulence, foreground and background images) is used to achieve the desired low rank matrix decomposition. The major disadvantage of this method is that, it can only detect slow moving objects, because it employs temporal image averaging as a pre-processing stage (which creates multiple blur footprints of fast moving objects) to remove most of the turbulence. Further, this method is slow and may be treated offline since it requires time to compute object confidence map using intensity and a motion model, which is necessary for moving object detection. Furthermore, this method causes increased blur due to image averaging.

Therefore, there exists a need for a fast and real-time technique for mitigating distortions in a multimedia content.

SUMMARY

According to various embodiments illustrated herein, there is provided a method for correcting distortions in a multimedia content comprising a set of temporal images. The method includes decomposing each image of the set of temporal images into patches. Thereafter, each set of temporal patches is parsed hierarchically. First stage of the hierarchical parsing includes generating a set of background components and a set of error components. Second stage of the hierarchical parsing includes identifying one or more moving objects based on the set of error components corresponding to each of the set of temporal patches. Thereafter, the set of background components and the one or more moving objects are aggregated to reconstruct the multimedia content.

According to various embodiments illustrated herein, there is provided a system for processing video data comprising a sequence of temporal frames. The system comprises an image pre-processing module and a parsing module. The image pre-processing module is configured for decomposing each frame of the set of temporal frames into non-overlapping patches. The parsing module is configured for hierarchically parsing the temporal patches to recover a background scene and one or more moving objects by recursively applying a Low Rank Matrix Decomposition (LRMD) technique on each set of temporal patches.

According to various embodiments illustrated herein, there is provided a computer program product for use with a computer. The computer program product comprises a non-transitory computer readable medium embodied therein a computer program code for processing video data. The computer program code comprising: program instructions means for decomposing each frame of the set of temporal frames in the video data into non-overlapping patches; program instructions means for recovering a background scene and one or more moving objects by recursively applying an LRMD technique on each set of temporal patches; and program instructions means aggregating the background scene and the one or more moving objects to reconstruct the video data.

BRIEF DESCRIPTION OF DRAWINGS

One or more embodiments are set forth in the drawings and in the following description. The appended claims particularly and distinctly point out and set forth the invention.

The accompanying drawings, which are incorporated in and constitute a part of the patent application, illustrate various embodiments of various aspects of the on-going description. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Figure 1:
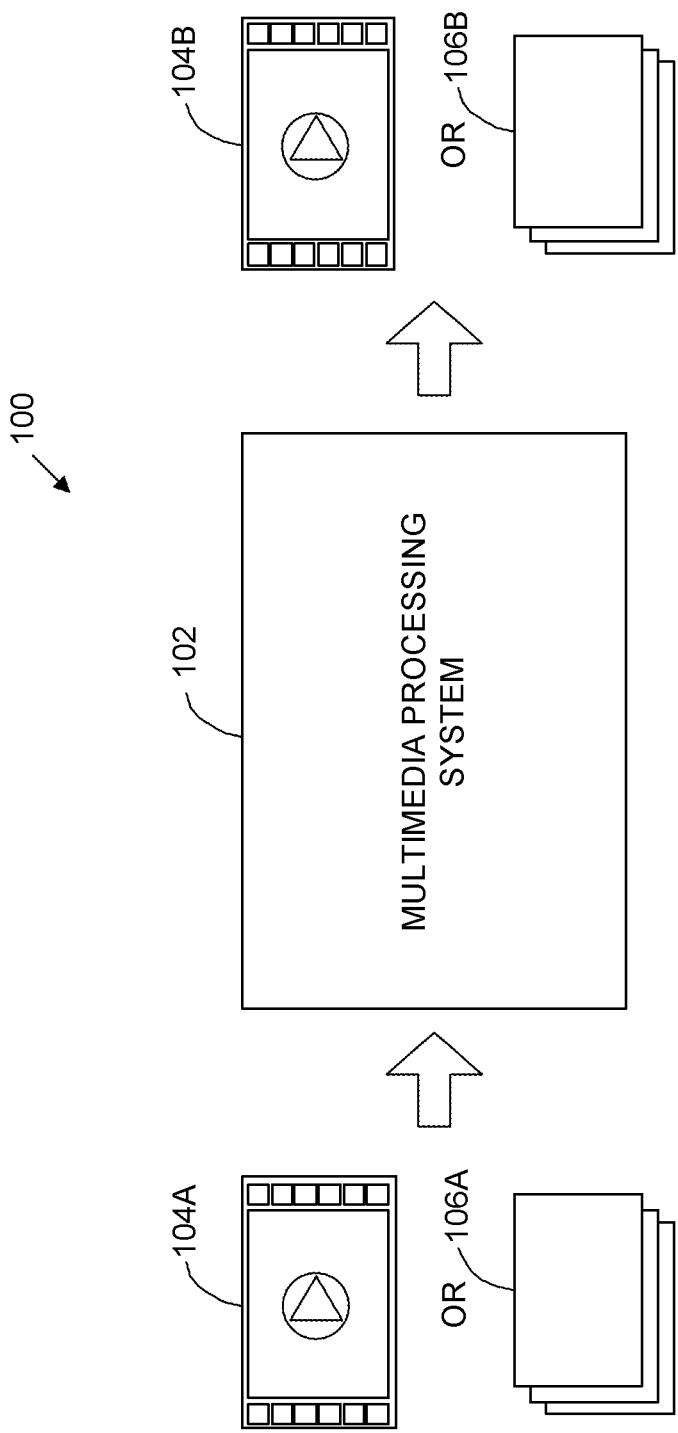
FIG. 1 is a block diagram illustrating an environment in which various embodiments can be implemented.

FIG. 1 is a block diagram illustrating an environment 100 in which various embodiments can be implemented. The environment 100 includes a multimedia processing system 102 receiving a multimedia content, such as, a video 104A or a set of temporal images 106A.

It is apparent to a person having ordinary skilled in the art that the video 104A is comprised of a set of temporal frames. Each frame of the temporal frames is an instantaneous image. Thus, the video can also be considered as a set of temporal images. Hereinafter, the terms frame and image have been used interchangeably. The video 104A and/or the set of temporal images 106A contain various disturbances/distortions (hereinafter, the terms disturbance and distortion will be used interchangeably). In an embodiment, the distortions correspond to turbulences such as atmospheric turbulence, water wave turbulence, hot air turbulence, and the like. In another embodiment, the distortions correspond to any other components in the multimedia content that disturbs viewing of various objects in the multimedia content when displayed.

The multimedia processing system 102 processes the multimedia content in order to remove the distortions and outputs a processed multimedia content, such as, a video 104B or a set of temporal images 106B. The multimedia processing system 102 will be explained in detail in FIG. 2.

Figure 2:
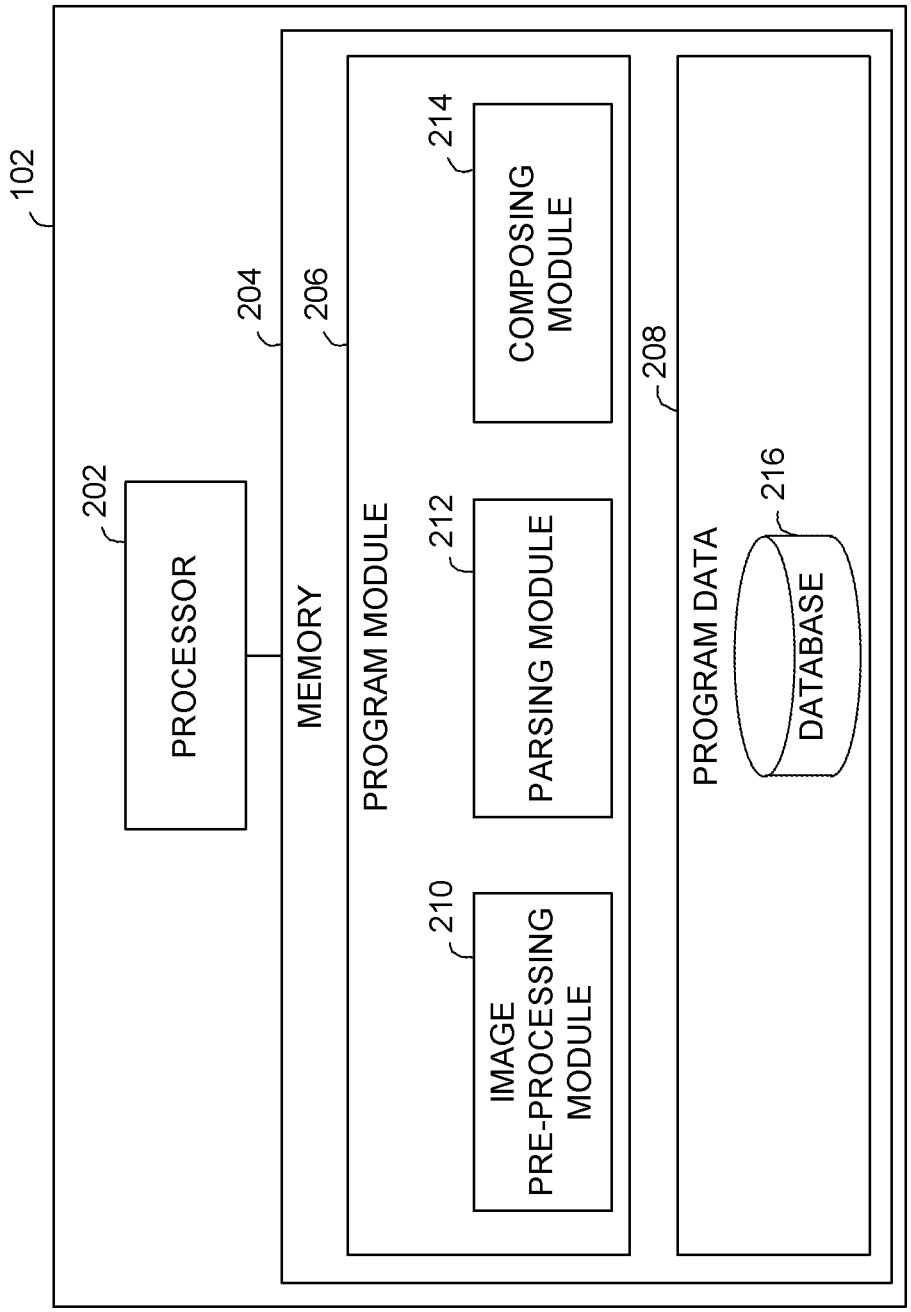
FIG. 2 is a block diagram illustrating a multimedia processing system in accordance with at least one embodiment.

FIG. 2 is a block diagram illustrating a multimedia processing system 102 in accordance with at least one embodiment. The multimedia processing system 102 includes a processor 202 coupled to a memory 204. The multimedia processing system 102 may further include various data input mediums (not shown), such as, a keyboard, mouse, joystick, microphone, camera, and the like. The multimedia processing system may also include various output mediums (not shown), such as, a display, a projector apparatus, speaker, and the like. The processor 202 communicates with the memory 204, the data input mediums, and the output mediums via an address/data/control bus.

Figure 6:
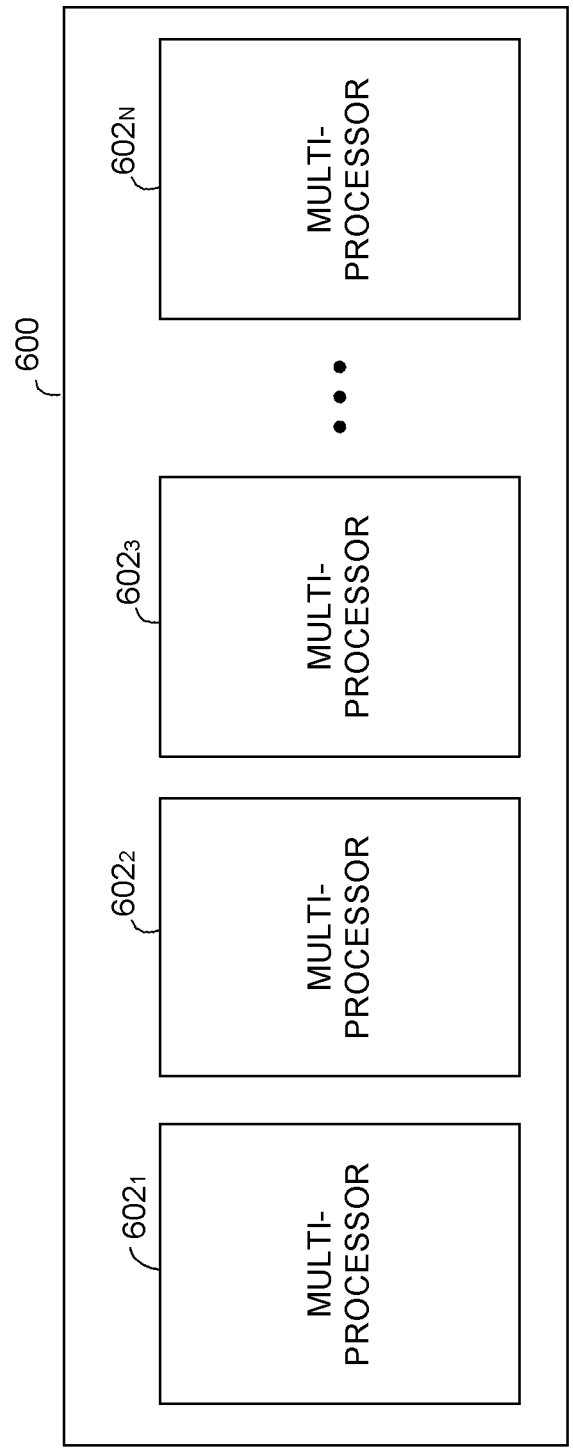
FIG. 6 is a block diagram illustrating a GPU in accordance with an embodiment.

The processor 202 may be realized as, for example, microprocessor (RISC or CISC). In an embodiment, the processor 202 is a multi-core processor. In an embodiment, the multi-core processor is a Graphical Processing Unit (GPU). The multi-core processor includes a plurality of cores distributed on several multi-processors (as shown in FIG. 6). Various types of the memory 204 may include, but are not limited to, cache, RAM, ROM, PROM, EPROM, EEPROM, flash, SRAM, and DRAM. The memory 204 may be implemented in the form of a storage device, which can be a hard disk drive or a removable storage drive, such as, a floppy disk drive, USB memory, memory cards, and an optical disk drive.

The memory 204 includes a program module 206 and a program data 208. The program module 206 includes an image pre-processing module 210, a parsing module 212, and a composing module 214. These modules contain program instructions for performing related operations under the control of the processor 202. The program data 208 includes a database 216 configured to store the data to be accessed by the image pre-processing module 210, the parsing module 212, and the composing module 214.

The image pre-processing module 210 is configured for retrieving the multimedia content (e.g., images or video) from the database 216. As discussed earlier the multimedia content contains a set of temporal images. The image pre-processing module 210 decomposes each of the set of temporal images in to patches. In an embodiment, for an image, the patches are non-overlapping. In another embodiment, for an image, the patches are overlapping.

Figure 3:
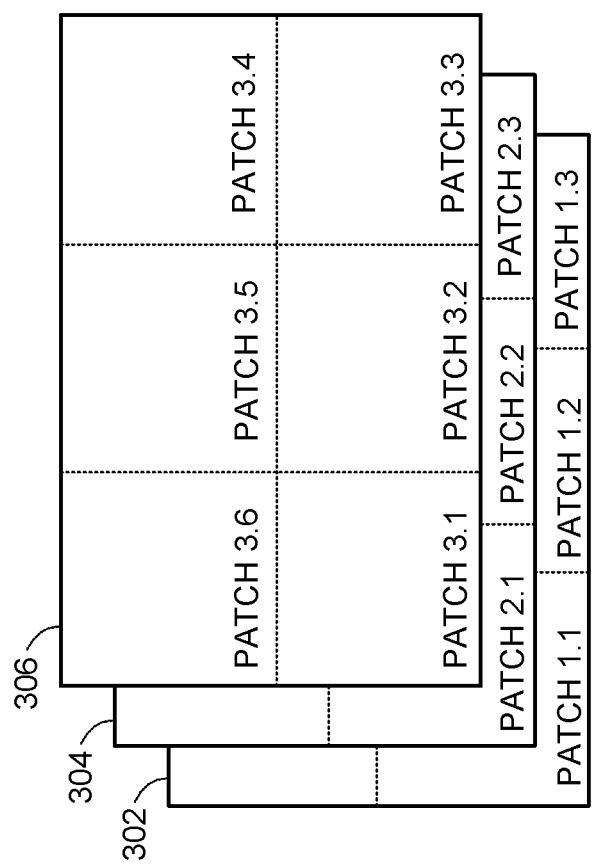
FIG. 3 is a block diagram depicting various images/frames of video decomposed into patches in accordance with at least one embodiment.

FIG. 3 represents a block diagram depicting various temporal images/frames of video decomposed into patches in accordance with at least one embodiment. As depicted in FIG, images (302, 304, and 306) are decomposed in various patches.

The image 302 is decomposed into six patches, PATCH 1.1, PATCH 1.2, PATCH 1.3, PATCH 1.4 (hidden), PATCH 1.5 (hidden), and PATCH 1.6 (partially hidden—partially shown above the PATCH 1.1). The image 304 is decomposed into six patches, PATCH 2.1, PATCH 2.2, PATCH 2.3, PATCH 2.4 (hidden), PATCH 2.5 (hidden), and PATCH 2.6 (partially hidden—partially shown above the PATCH 2.1). Similarly, the image 306 is decomposed into six patches, PATCH 3.1, PATCH 3.2, PATCH 3.3, PATCH 3.4, PATCH 3.5, and PATCH 3.6. Six patches are shown for illustrative purpose and it should be understood that any image can be portioned into a plurality of patches and may not be restricted to six only.

Each of the patches (PATCH 1.1-PATCH 1.6, PATCH 2.1-PATCH 2.6, and PATCH 3.1-PATCH 3.6) represents a portion of the corresponding image (302-306). Further, as depicted, the patches are non-overlapping. Various patches at the similar position in different images form a set of temporal patches. For example, the PATCH 1.1, the PATCH 2.1, and the PATCH 3.1 form a set of temporal patches. Thus, by portioning the images (302-306) creates multiple (in this case, six) sets of temporal patches.

Referring back to FIG. 2, once portioned, the image pre-processing module 210 stores the patches of the images (302-306) in the database 216.

The parsing module 212 obtains the set of temporal patches from the database 216 and separates each patch into a plurality of layers. For example, each patch is further decomposed into various layers such as a layer containing background, a layer containing moving object(s), and/or a layer containing turbulence. Thus, decomposition of each patch into the plurality of layers gives rise to a plurality of temporal patches. In this case, since a single patch results into three patches/layers, the layer containing background, the layer containing moving object(s), and the layer containing turbulence.

In order to separate the distortions from the set of temporal patches, in an embodiment, the parsing module 212 hierarchically parses the set of temporal patches by implementing a Low Rank Matrix Decomposition (LRMD) technique patch wise. By hierarchically parsing the patches, the parsing module 212 reconstructs the background scene and also identifies one or more moving objects in the multimedia content. The patch wise application of the LRMD technique is explained in conjunction with FIG. 4. Thereafter, the parsing module 212 stores the recovered the background scene and the information on the identified moving objects in the database 216.

The composing module 214 retrieves the background scene and the information on the identified moving objects from the database 216. Thereafter, the composing module 214 aggregates the background scene and the identified one or more moving objects patch wise to reconstruct the multimedia content having no distortions. In order to aggregate the background scene and the identified one or more moving objects, the composing module 214 implements various techniques, including but not limited to, weighted average blending, PCA-based fusion, etc. In an embodiment, if the patches are overlapping, the composing module 214 also interpolates the recovered background scene (patch wise) and the one or more moving objects (patch wise) to blend them well and achieve proper aggregation.

Figure 4:
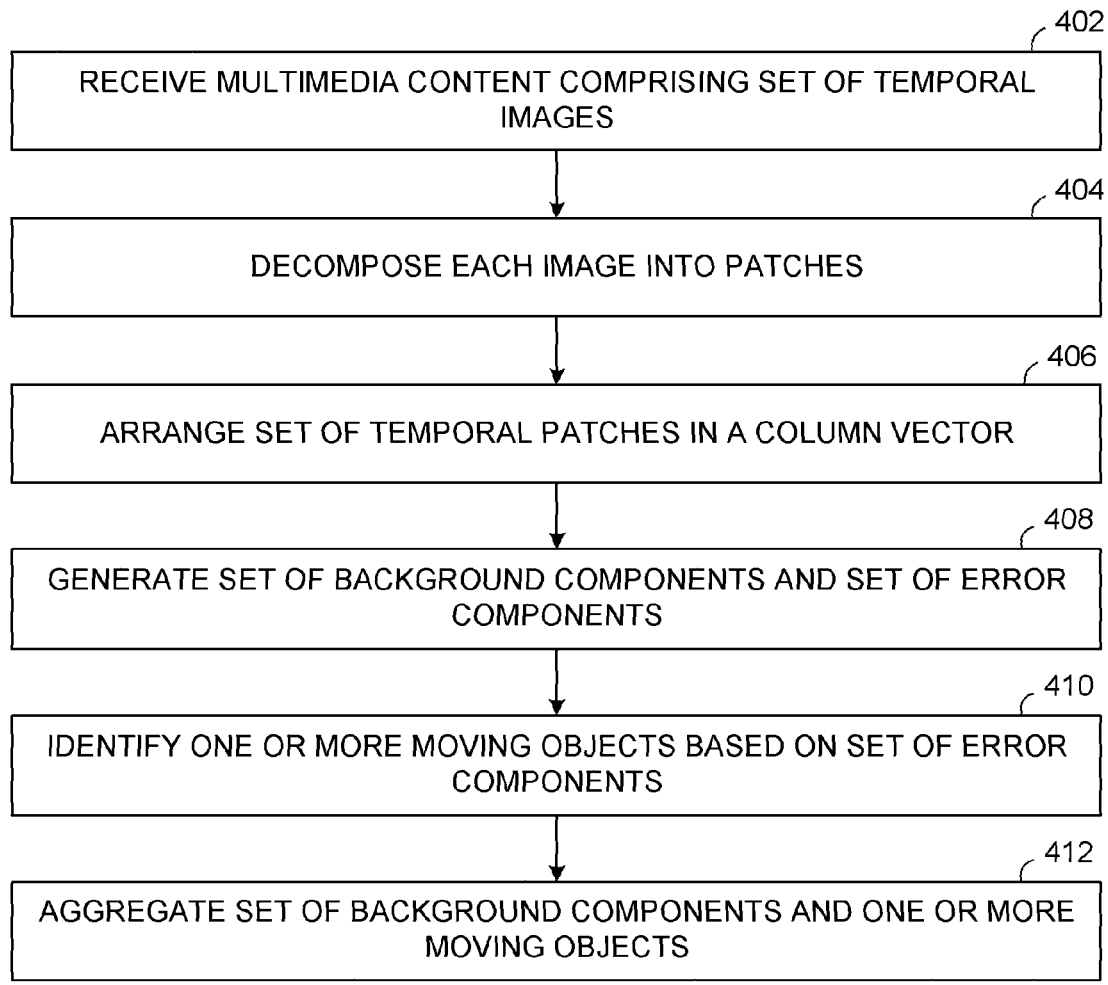
FIG. 4 is a flow diagram illustrating a method for mitigating distortions in a multimedia content in accordance with at least one embodiment.

FIG. 4 is a flow diagram illustrating a method for mitigating distortions in a multimedia content in accordance with at least one embodiment.

Figure 5A:
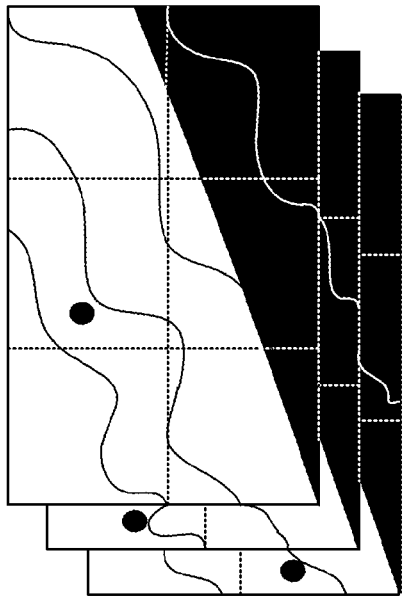
FIG. 5A depicts various temporal images/frames of an input video to be processed in accordance with at least one embodiment.

At step 402, the multimedia content (e.g., the video or the set of temporal images) is received by the multimedia processing system. In an embodiment, the received multimedia content is stored in the database 216. As discussed earlier, the received multimedia content comprises various distortions. FIG. 5A depicts various example temporal images/frames of an input video to be processed in accordance with at least one embodiment. As depicted, the frames of the video include stable background components constituting a steady background scene, a moving object 502, and distortions (shown as various curved lines/wavy pattern for illustration purposes). It is apparent to a person having ordinary skills in the art that the wavy pattern is shown only for illustrative purposes, the distortions can be random and/or non-periodic and addressed by the multimedia processing system 102 without limiting the scope of the on-going description.

Figure 5B:
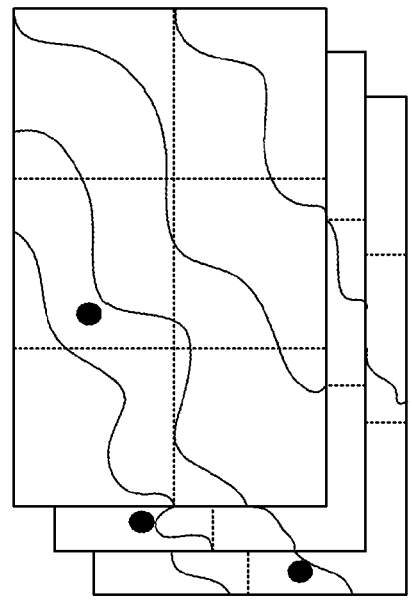
FIG. 5B depicts various temporal images/frames decomposed into patches in accordance with at least one embodiment.

At step 404, each image (or frame) of the multimedia content is decomposed into patches. In an embodiment, the image pre-processing module 210 decomposes the images into patches. This has been explained in conjunction with FIG. 2 and FIG. 3. FIG. 5B depicts the example set of temporal images/frames decomposed into patches in accordance with at least one embodiment.

At step 406, the set of temporal patches is arranged in a column vector. In an embodiment, the parsing module 212 arranges the set of temporal patches in the column vector, hereinafter referred to as a patch-wise degradation matrix ($D_p$):

$$D_p = \{\text{vec}\{I_{p1}\}, \text{vec}\{I_{p2}\}, \ldots, \text{vec}\{I_{pT}\}\} \quad \text{Equation-1}$$

Where, vec$\{I_{p1}\}$ denotes vectorization of patch p in frame 1; it means if size of $I_{p1}$ is Wp×Hp then size of Vec$\{I_{p1}\}$ is (WpHp)×1; $I_{p1}$ denotes patch p in frame 1 and T denotes total number of frames considered.

Thus, for example of FIG. 3, the following patch-wise degradation matrix ($D_p$) can exist:

For patch 1 across all frames, $D_p = D_{p1} = \{\text{vec}\{\text{PATCH } \mathbf{1.1}\}, \text{vec}\{\text{PATCH } \mathbf{2.1}\}, \text{vec}\{\text{PATCH } \mathbf{3.1}\}\}$.

For patch 2 across all frames, $D_p = D_{p2} = \{\text{vec}\{\text{PATCH } \mathbf{1.2}\}, \text{vec}\{\text{PATCH } \mathbf{2.2}\}, \text{vec}\{\text{PATCH } \mathbf{3.3}\}\}$.

For patch 3 across all frames, $D_p = D_{p3} = \{\text{vec}\{\text{PATCH } \mathbf{1.3}\}, \text{vec}\{\text{PATCH } \mathbf{2.3}\}, \text{vec}\{\text{PATCH } \mathbf{3.3}\}\}$.

For patch 4 across all frames, $D_p = D_{p4} = \{\text{vec}\{\text{PATCH } \mathbf{1.4}\}, \text{vec}\{\text{PATCH } \mathbf{2.4}\}, \text{vec}\{\text{PATCH } \mathbf{3.4}\}\}$.

For patch 5 across all frames, $D_p = D_{p5} = \{\text{vec}\{\text{PATCH } \mathbf{1.5}\}, \text{vec}\{\text{PATCH } \mathbf{2.5}\}, \text{vec}\{\text{PATCH } \mathbf{3.5}\}\}$.

For patch 6 across all frames, $D_p = D_{p6} = \{\text{vec}\{\text{PATCH } \mathbf{1.6}\}, \text{vec}\{\text{PATCH } \mathbf{2.6}\}, \text{vec}\{\text{PATCH } \mathbf{3.6}\}\}$.

At step 408, for each set of the temporal images, a set of background components and a set of error components are generated. In an embodiment, this step is performed as a first stage of the hierarchical parsing by the parsing module 212. During the first stage of the hierarchical parsing, the parsing module 212 processes each set of the temporal images from the patch-wise degradation matrix ($D_p$) to obtain the corresponding set of background components and the set of error components by applying the LRMD technique. The LRMD technique used herein is a patch wise application of a technique disclosed in a publication titled, "Robust Principal Component Analysis: Exact Recovery of Corrupted Low-Rank Matrices via Convex Optimization" published in NIPS, 2009, which is herein incorporated by reference, in its entirety. In an embodiment, the convex optimization technique disclosed in the above mentioned paper may differ from the technique applied in the present invention.

Thus, by applying the LRMD technique, a patch wise background matrix ($B_p$) and a patch wise error matrix ($E_p$) can be obtained. The background matrix ($B_p$) is a noise free matrix, such that error between $B_p$ and $D_p$ is minimized as:

$$\arg\min{}_{B_p, E_p} \|B_p\|^* + \lambda_p \|E_p\|_1 \text{ subject to } D_p = B_p + E_p \quad \text{Equation-2}$$

Where $\lambda_p$ represents a patch based Lagrange's weight parameter, $\|.\|^*$ denotes nuclear norm (i.e., sum of the singular values of matrix elements), and $\|.\|_1$ denotes $I_1$ norm (i.e., sum of absolute values of matrix elements).

$$\lambda p = \frac{c}{\sqrt{(Wp + Hp)}} \quad \text{Equation-3}$$

Where, C is a patch-wise constant and Wp and Hp are the width and height of the patch respectively.

Figure 5C:
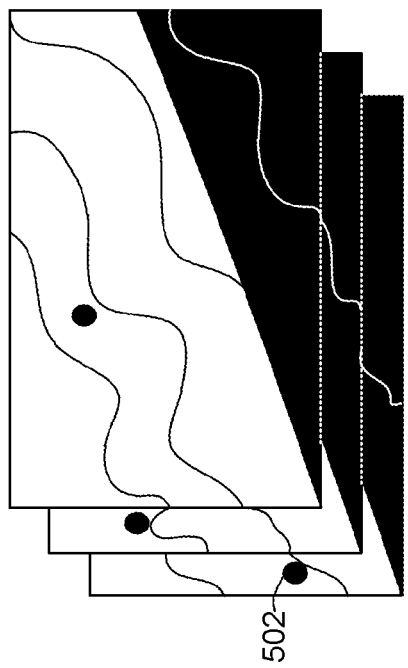
FIG. 5C depicts various temporal images/frames of video constituting a background scene in accordance with various embodiments.

Thus, patch wise background components (i.e., stable images) are present in the columns of the patch wise background matrix ($B_p$). For example, FIG. 5C depicts various temporal images/frames of video constituting a background scene in accordance with various embodiments. In an embodiment, the background scene might get blurred due to the application of the LRMD technique; however, the blur is quite less than the blur introduced by applying conventional techniques.

Figure 5D:
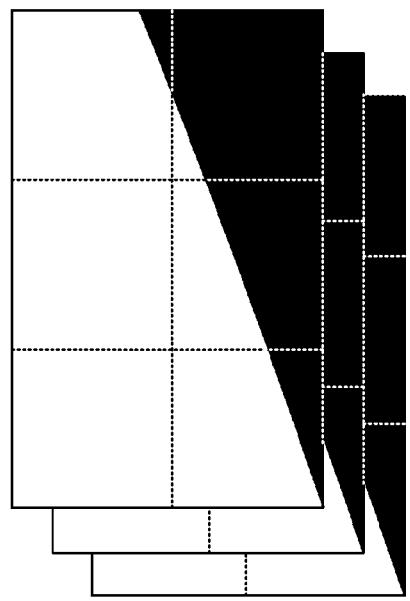
FIG. 5D depicts various temporal images/frames of video containing both distortions and moving objects in accordance with various embodiments.

Similarly, the patch wise distortions (e.g., combinations of turbulence and moving objects) are present in the columns of the patch wise error matrix ($E_p$). For example, FIG. 5D depicts various temporal images/frames of video containing both distortions and the moving object 502 in accordance with various embodiments. The images shown in FIG. 5D include the patch wise error components containing the distortions (shown as curved lines) and the moving object 502.

At step 410, the one or more moving objects are identified from the set of error components. In an embodiment, the parsing module 212 processes the set of error components in the form of the patch wise error matrix ($E_p$) in a second stage of the hierarchical parsing. As mentioned earlier, the set of error components contains the one or more moving objects (e.g., the moving object 502) and the distortions. As both are having different periodicities, the parsing module 212 applies the LRMD technique second time with higher weight to error component thus separates moving object layer from turbulent layer (e.g., distortion layer). Therefore, to find the moving object's presence, if any, in the actual scene, the patch wise error matrix ($E_p$) is processed with a modified LRMD technique. Then the Equation-2 can be modified as:

$$\arg\min_{B_p^B, E_p^E} \|B_p^B\|_* + \lambda_p^L \|E_p^E\|_1 \text{ subject to } E_p = E_p^B + E_p^E \quad \text{Equation-4}$$

Where, $\lambda_p^L$ is positive patch-wise Lagrange's weight parameter for moving object detection. $E_p^B$ and $E_p^E$ denote patch-wise error-turbulence matrix and error-moving object matrix respectively. In an embodiment, $\lambda_p^L$ is greater than $\lambda_p$. For example, $\lambda_p^L$ is 10 (Ten) times greater than $\lambda_p$. However, it should be apparent to a person having ordinary skills in the art that $\lambda_p^L$ can be greater than $\lambda_p$ by any other factor without departing from the scope of the on-going description.

$$\lambda_p^L = \frac{c}{\sqrt{(Wp + Hp)}} \quad \text{Equation-5}$$

Figure 5E:
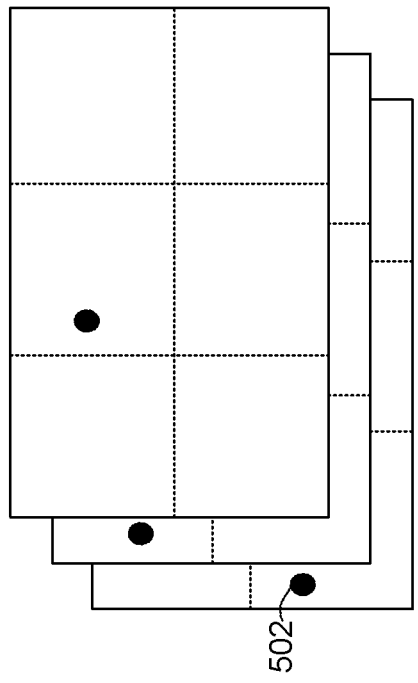
FIG. 5E depicts various temporal images/frames of video containing only distortions in accordance with various embodiments.
Figure 5F:
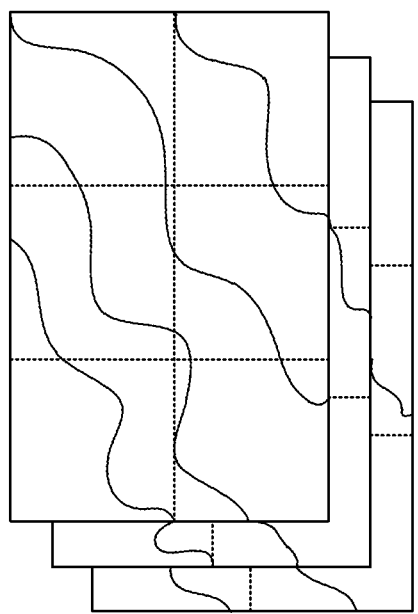
FIG. 5F depicts various temporal images/frames of video containing moving object(s) in accordance with various embodiments.

Thus, by applying the LRMD technique having sufficiently higher Lagrange's weight parameter, the parsing module 212 separates the moving object 502 (as shown in FIG. 5F) from the set of error components, and remaining patches (as shown in FIG. 5E) containing only the distortions can be rejected. FIG. 5E depicts various temporal images/frames of video containing only distortions in accordance with various embodiments. FIG. 5F depicts various temporal images/frames of video containing the moving object 502 in accordance with various embodiments.

The LRMD technique, as implemented by the parsing module 212, works on local isoplanatic patches. Since, these patches are independent of each other; they can be processed in parallel using multiple threads to achieve significant speed up that is much needed for real-time operation. This multi-thread processing can be performed using general purpose computing capabilities of graphical processing unit (GPU). The data level parallelism is employed over a temporal batch of patches. In an embodiment, speed enhancement of at least two to four folds can be achieved. In an embodiment, each set of temporal patches are processed to apply the hierarchical parsing on different cores of a multi-core processor (e.g., the processor 202). For example, the six sets of temporal patches, as shown in FIG. 3 or FIG. 5B can be processed on six different processor cores to achieve significant seed achievement. In another embodiment, the six sets can be processed on a plurality processor cores by processing the patches in multiple threads to achieve significant speed achievement.

Figure 5G:
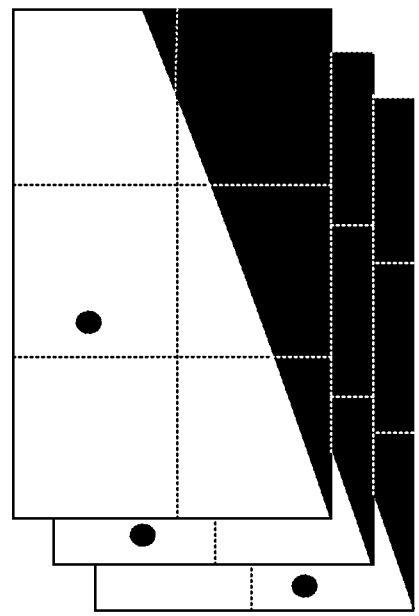
FIG. 5G depicts various temporal images/frames of video containing no distortions in accordance with various embodiments.

At step 412, the set of background components and the one or more moving objects are aggregated to reconstruct the multimedia content having no distortions. FIG. 5G depicts various temporal images/frames of video containing no distortions in accordance with various embodiments. In an embodiment, the composition module 214 combines the set of background components (as depicted in FIG. 5C) and the one or more moving objects (as depicted in FIG. 5C) to achieve the distortion free multimedia content.

FIG. 6 is a block diagram illustrating a GPU 600 in accordance with an embodiment. The GPU 600 includes a plurality of multi-processors ($602_1, 602_1, 602_1, \ldots, 602_N$). Each of the multi-processors ($602_1, 602_1, 602_1, \ldots, 602_N$) includes various processor cores. In an embodiment, each core executes a processing thread. For example, the processing thread corresponds to a patch. Processing threads corresponding to each set of temporal patches (e.g., each vectors from the patch wise degradation matrix ($D_p$)) is processed by cores on different multi-processors ($602_1, 602_1, 602_1, \ldots, 602_N$). However, it is apparent to a person having ordinary skills in the art that any other scheduling techniques can also be used to process the temporal patches on various processor cores without departing from the scope of the on-going description. This is possible since the patches are isoplanatic and independent of one another. Thus, GPU helps rapidly process the temporal patches. Execution of the processing threads on the different cores results in increased speed of processing.

Embodiments of the present invention may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the computer-readable medium or by copying the code from the computer-readable medium into another computer-readable medium (e.g., a hard disk, RAM, etc.) or by transmitting the code on a network for remote execution. Various methods described herein may be practiced by combining one or more computer-readable media containing the code according to the present invention with appropriate standard computer hardware to execute the code contained therein. An apparatus for practicing various embodiments of the present invention may involve one or more computers (or one or more processors within a single computer, or one or more processor cores) and storage systems containing or having network access to computer program(s) coded in accordance with various methods described herein, and the method steps of the invention could be accomplished by modules, routines, subroutines, or subparts of a computer program product.

While for purposes of simplicity of explanation, the illustrated methodologies are shown and described as a series of blocks/steps, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Various embodiments of the control apparatus and method for mitigating distortions in multimedia content have been disclosed. It should be apparent, however, to those skilled in the art that many more modifications besides those already described are possible without departing from the inventive concepts herein. The embodiments, therefore, are not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Various embodiments described above have numerous advantages. The method described is robust for both turbulence correction and moving object detection in videos. The patch wise processing eliminates the need for image registration as well as enables fast processing. Further, the patch wise processing enables detections of even fast moving objects in videos. Further processing of the temporal patches on multi-core processor/GPU provides a multi fold increase in processing speed. Thus, a real time processing of videos and images can be achieved.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

What is claimed is:

1. A method for correcting distortions in a multimedia content comprising a set of temporal images, the method comprising:
    decomposing each image of the set of temporal images into one or more patches and creating one or more sets of temporal patches wherein each set of temporal patches comprise of patches present at similar location in each image of the set of temporal images;
    hierarchically parsing each set of temporal patches, wherein the hierarchically parsing comprises:
        generating a set of background components and a set of error components by processing the set of temporal patches by applying a Low Rank Matrix Decomposition by utilizing a first Lagrange's parameter; and
        identifying one or more moving objects based on the set of error components corresponding to each of the set of temporal patches by processing the set of error components by applying the Low Rank Matrix Decomposition technique again but utilizing a second Lagrange's parameter, wherein the value of the second Lagrange's parameter is greater than the value of the first Lagrange's parameter; and
    aggregating the set of background components and the one or more moving objects to reconstruct the multimedia content.

2. The method of claim 1, wherein the multimedia content corresponds to video data.

3. The method of claim 1, wherein the hierarchically parsing comprises breaking each of the set of temporal patches into layers.

4. The method of claim 1, wherein the generating comprises arranging the set of temporal patches in a column vector.

5. The method of claim 1 further comprises extracting distortion components from the set of error components while applying the Low Rank Matrix Decomposition technique with the second Lagrange's parameter.

6. The method of claim 5, wherein the value of the second Lagrange's parameter is greater than the value of the first Lagrange's parameter.

7. The method of claim 5, wherein the distortion components correspond to turbulent distortion caused due to at least one of atmospheric turbulence, water wave turbulence and hot air turbulence.

8. The method of claim 1, wherein, for the set of temporal patches, the generating and identifying are performed on a plurality of processor cores.

9. The method of claim 1, wherein the patches are non-overlapping to one another.

10. The method of claim 1, wherein the patches are overlapping to one another.

11. The method of claim 10, wherein the aggregating further comprises interpolating at least one of the set of background components and the one or more moving objects.

12. A system for processing video data comprising a sequence of temporal frames, the system comprising:
    an image pre-processing module configured for decomposing each frame of the set of temporal frames into one or more patches and creating one or more sets of temporal patches wherein each set of temporal patches comprise of patches present at similar location in each image of the set of temporal images; and
    a parsing module configured for
        generating a set of background components and a set of error components by processing the set of temporal patches by applying a Low Rank Matrix Decomposition by utilizing a first Lagrange's parameter; and
        identifying one or more moving objects based on the set of error components corresponding to each of the set of temporal patches by processing the set of error components by applying the Low Rank Matrix Decomposition technique again but utilizing a second Lagrange's parameter, wherein the value of the second Lagrange's parameter is greater than the value of the first Lagrange's parameter.

13. The system of claim 12, wherein each of the one or more patches correspond to a portion of the frame.

14. The system of claim 12, wherein the parsing module is further configured to arrange a set of temporal patches across the set of temporal frames in a column vector.

15. The system of claim 12 further comprising a composing module for reconstructing the video data by aggregating the set of background components and the one or more moving objects.

16. The system of claim 12 further comprises a processor to control the image pre-processing module and the parsing module.

17. The system of claim 16, wherein the processor is a multi-core processor.

18. The system of claim 17, wherein each set of temporal patches is processed by the parsing module on a separate processor core.

19. The system of claim 17, wherein each set of temporal patches is processed by the parsing module on a plurality of processor cores with a scheduling technique.

20. The system of claim 17, wherein the multi-core processor is a Graphical Processing Unit (GPU).

21. A computer program product for use with a computer, the computer program product comprising a non-transitory computer readable medium embodied therein a computer program code for processing video data comprising a set of temporal frames, the computer program code comprising:

program instructions means for decomposing each frame of the set of temporal frames in the video data into one or more patches and creating one or more sets of temporal patches wherein each set of temporal patches comprise of patches present at similar location in each frame of the set of temporal frames;

program instructions means for recovering a set of background components a set of error components by processing the set of temporal patches by applying a Low Rank Matrix Decomposition by utilizing a first Lagrange's parameter; and for identifying one or more moving objects based on the set of error components corresponding to each of the set of temporal patches by processing the set of error components by applying the Low Rank Matrix Decomposition technique again but utilizing a second Lagrange's parameter, wherein the value of the second Lagrange's parameter is greater than the value of the first Lagrange's parameter; and program instructions means for aggregating the background components and the one or more moving objects to reconstruct the video data.

* * * * *